United States Patent [19]

Demmer

[11] Patent Number: 4,507,446

[45] Date of Patent: Mar. 26, 1985

[54] WATER-SOLUBLE OR WATER-DISPERSIBLE RESINOUS SULPHUR OR PHOSPHORUS CONTAINING SALTS, THEIR PREPARATION, AND THEIR USE IN COATINGS

[75] Inventor: Christopher G. Demmer, Cambridge, England

[73] Assignee: Ciba-Geigy Corporation, Ardsley, N.Y.

[21] Appl. No.: 474,904

[22] Filed: Mar. 14, 1983

[30] Foreign Application Priority Data

Mar. 23, 1982 [GB] United Kingdom ............... 8208401

[51] Int. Cl.³ .................. C07C 143/64; C08G 18/58; C08L 61/10; C07F 9/38
[52] U.S. Cl. ............................... 525/523; 260/507 R; 427/385.5; 525/533; 525/481; 528/98; 528/99; 528/108; 528/109; 252/188.31
[58] Field of Search ............... 525/523; 528/107, 108, 528/109

[56] References Cited

U.S. PATENT DOCUMENTS

| | | | |
|---|---|---|---|
| 3,155,743 | 11/1964 | Newey | 525/523 |
| 3,415,779 | 12/1968 | Preininger et al. | 525/533 |
| 3,477,990 | 11/1969 | Dante et al. | 525/523 |
| 3,516,965 | 6/1970 | Washburn | 525/523 |
| 3,576,786 | 4/1971 | Kalfayan et al. | 525/523 |
| 3,936,399 | 2/1976 | Hirai et al. | 528/159 |
| 3,994,989 | 11/1976 | Kempter et al. | 260/831 |
| 4,000,116 | 12/1976 | Renner | 260/47 |
| 4,014,955 | 3/1977 | Renner | 525/481 |
| 4,188,312 | 2/1980 | Kempter et al. | 525/109 |
| 4,189,450 | 2/1980 | Kempter et al. | 525/455 |
| 4,260,697 | 4/1981 | Kempter et al. | 525/484 |
| 4,317,757 | 3/1982 | Kooijmans et al. | 524/541 |
| 4,332,709 | 6/1982 | Kooijmans et al. | 523/416 |
| 4,362,853 | 12/1982 | Demmer | 525/533 |
| 4,379,872 | 4/1983 | Ishikura et al. | 525/523 |
| 4,410,675 | 10/1983 | Demmer | 525/533 |

FOREIGN PATENT DOCUMENTS

| | | |
|---|---|---|
| 1428835 | 5/1973 | United Kingdom . |
| 1457932 | 4/1974 | United Kingdom . |
| 2083044 | 8/1981 | United Kingdom . |

OTHER PUBLICATIONS

(Derwent Plasdoc Abstract No. 19047Q), (1964).
Derwent C. P. I. Abstract No. 32615, W/20, (1975).
Chemical Abstracts 53 21814e, (1959).
Chemical Abstracts 73 87977c, (1970).

*Primary Examiner*—A. Lionel Clingman
*Attorney, Agent, or Firm*—Harry Falber

[57] ABSTRACT

Water-soluble or water-dispersible resinous salts are prepared by 'tipping' an epoxy resin with a phenol, then carrying out a Mannich reaction with an aldehyde (usually formaldehyde) and an aminosulfonic or aminophosphonic acid, followed by salt formation on the free acid groups, preferably using an aliphatic amino alcohol, e.g., 2-dimethylaminopropan-1-ol.

Such salts may be crosslinked by heating in the presence of an aminoplast, a phenol-formaldehyde resin or a blocked polyisocyanate or, when the salts contain free methylol groups, by heating alone. They can be used for preparing coating compositions.

9 Claims, No Drawings lithographic compositions, and as laking components for basic dyes in flexographic inks.

West German Offenlegungsschrift No. 2 353 642 discloses binders for heat-hardenable moulding compositions comprising (a) a phenolformaldehyde condensation product modified by an aminocarboxylic acid or aminosulphonic acid and (b) a hardener. The condensation product (a) can be obtained by heating 2–6 mols of phenol, 1 mol of amino acid, and 0.5–1 mol of formaldehyde per mol of the combined phenol and amino acid. The condensation can be effected either without a catalyst or in the presence of an alkali, to give a product similar to a novolak. Aminosulphonic acids said to be suitable are taurine, methyltaurine, sulphanilic acid, and aminopropylsulphonic acid. The product is soluble in aqueous alkali and is especially suitable for use in foundry moulding compositions. Hexamethylenetetramine is specified as hardener.

U.S. Pat. No. 4,317,757 discloses water-thinnable, heat-curable binders for coatings, prepared by reacting a polyglycidyl ether of a polyhydric phenol with neutralised sulphanilic acid in a ratio of 0.9 to 1.1 NH equivalents per epoxy equivalent. The binders are said to be particularly suitable for use in aqueous can lacquers, together with aminoplasts or phenoplasts as crosslinking agents. The sulphanilic acid is preferably neutralised with an alkali metal hydroxide or a tertiary amine. The reaction between the epoxide resin and the neutralised sulphanilic acid is preferably carried out at 100°–130° C. for 2–7 hours. In the Examples, epoxide resins having molecular weights of 950 and 370 respectively are used and the reactants are heated at 124° C. for 5 hours.

U.S. Pat. No. 4,332,709 describes water-thinnable binders suitable for use in aqueous can lacquers. They are prepared by reacting a polyglycidyl ether of a polyhydric phenol with an aliphatic amino acid in which at least 50% of the acid groups have been neutralised with a base, in a ratio of 0.7 to 1.2 NH equivalents per epoxy equivalent. Suitable amino acids are said to include carboxylic acids and sulphonic acids, but no specific aminosulphonic acids are suggested. Suitable neutralising bases are said to be alkali metal hydroxides, tertiary amines, and quaternary ammonium hydroxides. The epoxide resin is preferably heated with the neutralised amino acid at 90°–100° C. for about 15 minutes. The binders may be included in aqueous coating compositions together with aminoplasts or phenolic resins as crosslinking agents.

British Patent Specification No. 2,083,044 discloses water-dispersible, modified epoxy resins having a terminal amphoteric aminosulphonate group of formula $-CH_2-C(R_1)OH-CHR_2-NH(R_3)-R_4^+-SO_3^-$, where $R_1$ and $R_2$ represent a hydrogen atom or a methyl group, $R_3$ represents a hydrogen atom, or an alkyl group optionally substituted with higher alkylsulphinyl or higher alkanoyloxy, and $R_4$ represents alkylene optionally substituted with 2-hydroxyethyl. The modified resins are obtained by reacting epoxide resins having a terminal glycidyl group with an aminosulphonate $R_3NHR_4SO_3M$ where M is a cation. Preferred aminosulphonates are sodium and potassium salts of taurine, N-(alkyl)taurines, and 6-aminohexane-1-sulphonic acid. Preferably, at least 20% of the glycidyl groups are converted into the aminosulphonate groups. Suggested uses for the modified resins include use in aqueous coating compositions, alone or together with an aminoplast.

SUMMARY OF THE INVENTION

This invention provides new, water-soluble or water-dispersible sulphur or phosphorus-containing salts of the general formula I

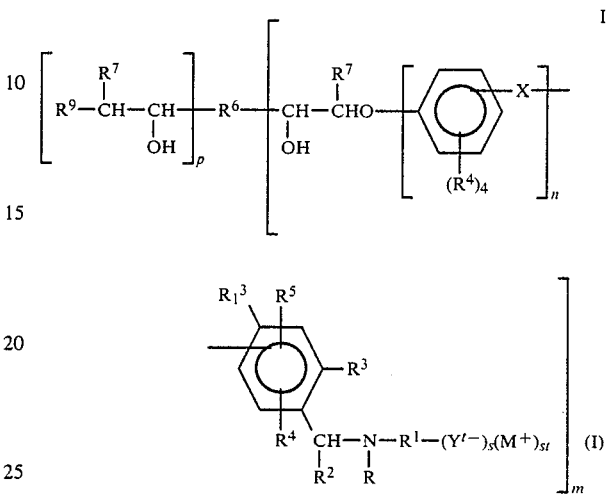

where

R represents a hydrogen atom or an alkyl group of from 1 to 6 carbon atoms, $R^1$ represents an aliphatic, aromatic, or araliphatic di- or trivalent hydrocarbon group having up to 10 carbon atoms, $R^2$ represents a hydrogen atom or an alkyl group of 1 to 4 carbon atoms, one of $R^3$ and $R_1^3$ represents a hydroxyl group and the other represents a hydrogen atom, a halogen atom, an alkyl group of 1 to 4 carbon atoms, or an alkenyl group of 2 to 4 carbon atoms, each $R^4$ represents a hydrogen atom, a halogen atom, an alkyl group of 1 to 4 carbon atoms, or an alkenyl group of 2 to 4 carbon atoms, $R^5$ represents an atom or a group bonded to a ring carbon atom which is ortho or para to the group $R^3$ or $R_1^3$ that represents a hydroxyl group, and is a hydrogen atom, a halogen atom, an alkyl group of 1 to 4 carbon atoms, an alkenyl group of 2 to 4 carbon atoms, a group of formula $-CH(R^2)OH$, a group of formula $-CH(R^2)OR^8$, or a group of formula II

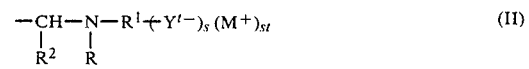

$R^6$ represents the residue of a polyepoxide after removal of (m+p) 1,2-epoxide groups, each of the substituents $R^7$ represents either a hydrogen atom or a covalent bond linked to the group $R^6$ to form a cycloaliphatic ring, $R^8$ represents either an alkyl group of from 1 to 6 carbon atoms or an alkoxyalkyl group wherein the alkoxy group and the alkyl group each have from 1 to 6 carbon atoms, $R^9$ represents the residue of a monohydric phenol, a secondary monoamine, or a monocarboxylic acid after removal of the hydrogen atom of the phenolic hydroxyl group, the carboxylic acid group, or the secondary amino group,

WATER-SOLUBLE OR WATER-DISPERSIBLE RESINOUS SULPHUR OR PHOSPHORUS CONTAINING SALTS, THEIR PREPARATION, AND THEIR USE IN COATINGS

BACKGROUND OF THE INVENTION

This invention relates to new, water-soluble or water-dispersible resinous sulphur or phosphorus-containing salts, to a process for their preparation, compositions containing them, and a method of coating surfaces with such compositions.

To obtain a corrosion-resistant coating for metal containers it is conventional to coat the metal surface with a crosslinkable resin formulation dissolved in an organic solvent and then to heat the coating to evaporate the solvent and to crosslink the resin. Crosslinking the coating converts it into a tough, adherent, flexible, and protective film. During heating, the solvent is usually evaporated into the atmosphere. Since organic solvents are relatively expensive, inflammable, and usually environmentally objectionable, there exists a need for coatings which may be applied using minimal proportions of such solvents, particularly useful being coating compositions which contain a high proportion of water.

We have now found that stable aqueous compositions which cure to give coatings having excellent mechanical properties and chemical resistance may be prepared from new resinous sulphur or phosphorus-containing salts. These salts are prepared from a phenol-terminated resin by a Mannich reaction with an aldehyde and an aminosulphonic acid or an aminophosphonic acid followed by partial or complete neutralisation of the acid group or groups introduced by this reaction. The salts may be used with an aminoplast, a phenol-formaldehyde resin, or a blocked polyisocyanate as aqueous surface coating compositions. In certain circumstances the addition of such a coreactant is not, however, necessary.

The use of a Mannich reaction to obtain water-soluble coating compositions from epoxides or phenols has already been disclosed.

For example, in U.S. Pat. No. 4,188,312 there are described coating compositions containing the reaction product of an epoxide resin (i.e., a compound having, per average molecule, more than one 1,2-epoxide group) with a Mannich base and an alkenylphenol. This Mannich base is the reaction product of a polyhydric polynuclear phenol, a secondary amine containing at least one hydroxyalkyl group, and formaldehyde. U.S. Pat. No. 4,189,450 describes coating compositions prepared from an epoxide resin and a Mannich base derived from a condensed phenol, a secondary amine containing at least one hydroxyalkyl group, formaldehyde, and a butadiene or isoprene homo- or co-polymer containing phenolic groups. The products are epoxide-free and are water-soluble in their protonated form.

British Patent Specification No. 1,428,835 describes a cationic polymer prepared by the aminomethylation of a p-hydroxystyrene polymer, using formaldehyde and a secondary amine which either has alkyl, alkenyl, or aromatic groups attached to the nitrogen atom or is a heterocycle having 4 to 6 carbon atoms in the ring. The product may be quaternised or an acid addition salt may be formed from it.

U.S. Pat. Nos. 4,000,116 and 4,014,955 describe crosslinked macromolecular polyethers prepared by reaction of a Mannich base with a polyepoxide, followed by polyquaternisation, or by reaction with a compound containing both a chlorine, bromine, or iodine atom bonded to a hydrocarbon radical and at least one epoxide group. The Mannich bases are prepared from a monomeric bisphenol and the amines used are dialkylamines or morpholine.

British Patent Specification No. 1,457,932 describes epoxide group-free polymers which are prepared by reaction of a Mannich base with an epoxide resin, followed by salt formation. The Mannich base, containing one or more cationic hydroxyalkylaminomethyl groups attached to each aromatic ring, is prepared by reaction of a bisphenol, a hydroxyl group-containing secondary amine, or a mixture of such an amine with another primary or secondary amine, and formaldehyde. The resin therefore contains these cationic groups attached to each ring in as many residues derived from the Mannich base as are in the molecular chain.

In the processes described in other patent specifications of this type, polymeric bisphenols which are reaction products of monomeric bisphenols and epoxide resins are reacted with formaldehyde and a hydroxyalkyl group-containing secondary amine to produce polymeric Mannich base bisphenols. For example, in the process described in U.S. Pat. No. 3,994,989 such a polymeric bisphenol is reacted in admixture with a monomeric bisphenol; in the process described in British Patent Specification No. 1,563,917 the polymeric bisphenol is reacted alone or in admixture with a monomeric bisphenol. The polymeric Mannich base bisphenols have cationic hydroxyalkylaminomethyl groups attached to only one aromatic ring at each end of the chain. However, these polymeric Mannich base bisphenols are not used directly in coating compositions, but are further advanced by reaction with epoxide resins to produce bisphenols of yet higher molecular weight. In the latter, the cationic groups would be attached to the terminal aromatic rings of the residues derived from the polymeric Mannich base bisphenols not only at the ends of the molecular chain of the final product but also wherever those residues occur in the remainder of the chain.

In U.S. Pat. No. 3,936,399 phenolic chelating resins are described which are prepared by a Mannich reaction of a phenol, iminodiacetic acid, and an aldehyde, and polycondensing the resultant product with an aldehyde. The polycondensed resin has highly selective adsorbability to heavy metals. There is no indication that the intermediate material, prepared by the Mannich reaction, would have any other utility.

West German Offenlegungsschrift No. 1 445 535 describes the preparation of alkali-soluble condensation products by reacting, in alkaline, acid, or neutral aqueous medium, (a) a phenol or naphthol, (b) formaldehyde or a formaldehyde-generating substance, (c) a 5- or 6-membered heterocyclic compound, and (d) a mononuclear aromatic carboxylic or sulphonic acid, optionally containing hydroxyl or amino groups, an aryloxy fatty acid, or an aliphatic polycarboxylic acid. Components (a) and (b) are reacted first and the product is reacted in any order with (c) and (d), and optionally with more formaldehyde. The phenol (a) may be a bisphenol such as bisphenol A. Suitable heterocyclic compounds (c) include carbazole, quinoline, and pyrrolidone. Suitable aminosulphonic acids for use as (d) are sulphanilic acid and metanilic acid. The condensation products are said to be useful in carbon paper waxes, m represents 1, 2, 3, or 4,
n represents zero or 1,
p represents zero or 1 such that (m+p) is at least 2 and at most 4,
t represents 1 or 2,
X represents an alkylene or alkylidene group of 1 to 3 carbon atoms, a carbonyl or sulphonyl group, an oxygen or sulphur atom, or a valency bond, $M^+$ represents a hydrogen ion, a cation derived from an alkali metal, ammonia, an amine, including quaternary ammonium cations, or one valency of a polyvalent cation, with the proviso that at least 25% of the ions $M^+$ represent said cation, s represents 1 or 2, and $Y^{t-}$ represents an anion of formulae III, IV or V

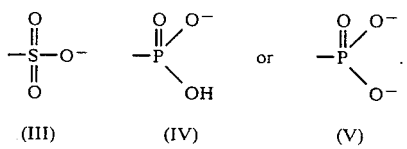

(III) (IV) (V)

DETAILED DISCLOSURE

Preferred salts of formula I are those wherein $R^6$ represents a residue having an average molecular weight of from 1000 to 5000 and those wherein (m+p) represents 2. Particularly preferred such salts are those wherein R represents a hydrogen atom and $R^1$ represents an alkylene or alkylidene group of 1 to 4 carbon atoms or an arylene, aralkylidene or aralkylene group having up to 10 carbon atoms. The preferred halogen atoms within the definitions of $R^3$, $R_1^3$, $R^4$, and $R^5$ are chlorine and bromine.

Preferably the salts of formula I are further of the formulae VI or VII

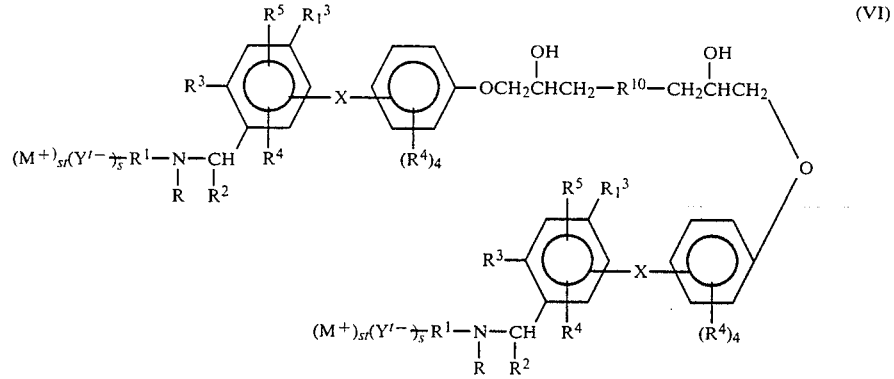

or

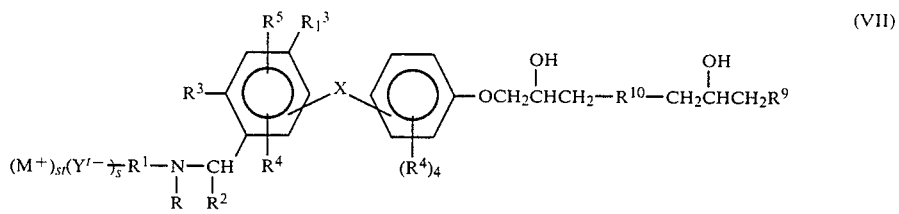

where
R, $R^1$, $R^2$, $R^3$, $R_1^3$, $R^4$, $R^5$, $R^9$, X, Y, $M^+$, s, and t, are as hereinbefore defined and $R^{10}$ represents the residue of an aliphatic, cycloaliphatic, or aromatic diglycidyl ether or diglycidyl ester after removal of both glycidyl groups.

It is further preferred that the residue $R^{10}$ in the compounds of formula VI or formula VII is itself of formula VIII

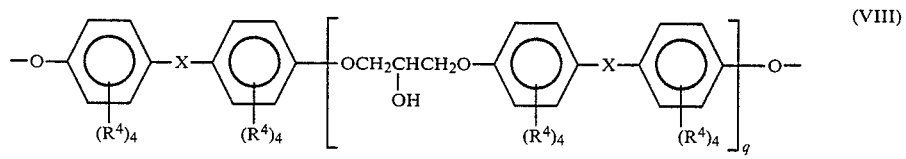

where
$R^4$ and X are as hereinbefore defined and
q is zero or an integer of from 1 to 20, and is preferably from 2 to 10.

Salts of formula I, VI, and VII wherein the group $R^3$ represents a hydroxyl group are particularly preferred, as are those in which $R^2$ and $R^4$ both represent a hydrogen atom.

Another aspect of this invention is a process for the preparation of water-soluble or water-dispersible resinous salts which comprises reaction of a phenol-terminated resin of formula IX

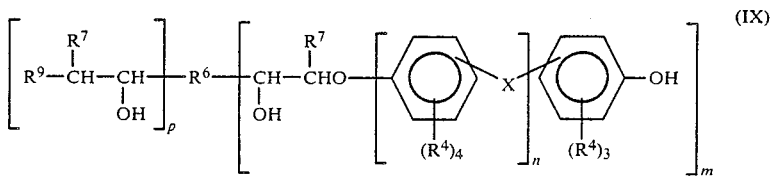

wherein
$R^4$, $R^6$, $R^7$, $R^9$, X, m, n, and p are as hereinbefore defined, with the proviso that at least one of the two carbon atoms ortho, or the one carbon atom para, to the carbon atom bearing the indicated phenolic hydroxyl group is unsubstituted, in the presence of a source of $M^+$ (where $M^+$ is as previously defined) ions with an aldehyde of formula X $$R^2CHO \qquad (X)$$

where $R^2$ is as hereinbefore defined, and an aminosulphonic or aminophosphonic acid of formula XI

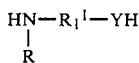

where
R is as hereinbefore defined,
$R_1{}^1$ represents an aliphatic, aromatic, or araliphatic di- or trivalent hydrocarbon group having up to 10 carbon atoms which may contain a free phosphonic or sulphonic acid group of formula $-S(:O)_2OH$ or $-P(:O)(OH)_2$, and
Y represents the residue of a sulphonic or phosphonic acid after removal of one hydrogen atom (i.e., $-SO_3-$ or $-PO_2H-$).

This reaction is preferably effected by heating the reactants in the presence of sufficient of a base at least partially to neutralise any free acid, and optionally in the presence of a surfactant as phase transfer catalyst. Usually an inert solvent is present. The reaction temperature is preferably within the range 60° to 180° C., especially 75° to 140° C., and the reaction is usually complete within 15 minutes to 8 hours. Suitable inert solvents include hydrocarbons, ethers, alcohols, and esters; amongst these, toluene, xylene, tetrahydrofuran, butanols, ethyl acetate, and especially 2-butoxyethanol and 2-ethoxyethanol, are preferred. Suitable bases for the at least partial neutralisation include sodium hydroxide, sodium carbonate, potassium hydroxide, potassium carbonate, ammonia, triethylamine, and triethanolamine; 2-(dimethylamino)-2-methylpropan-1-ol and 2-(dimethylamino)ethanol are particularly preferred.

If the reaction of the phenol-terminated resin of formula IX with the aldehyde of formula X and the aminosulphonic or aminophosphonic acid of formula XI is effected in the presence of a suitable alcohol, such as those mentioned above, etherification of groups $R^5=-CH(R^2)OH$ to groups $-CH(R^2)OR^8$ may occur.

Usually 0.3 to 2.0 moles of the amino acid of formula XI are employed per mole of phenolic hydroxyl groups in the resin of formula IX. An excess of the aldehyde of formula X is usually employed, especially 1.1 to 4.0 moles of the aldehyde per mole of the acid of formula XI, since the products then exhibit greater stability to storage at room temperature.

The preferred aldehyde of formula X is formaldehyde, which is conveniently formed in situ from paraformaldehyde.

Suitable amino acids of formula XI include sulphanilic acid, taurine, orthanilic acid, 2-aminobenzene-1,4-disulphonic acid, and phosphorus-containing acids of formula XII

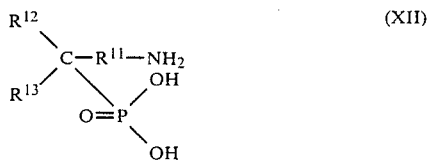

where either
$R^{11}$ represents a covalent bond or an alkylene group of 1 to 4 carbon atoms,
$R^{12}$ represents an alkyl group of 1 to 4 carbon atoms, an aryl group of 6 to 10 carbon atoms, or a group of formula XIII

and
$R^{13}$ represents a hydrogen atom, an alkyl group of 1 to 4 carbon atoms, or an aryl group of 6 to 10 carbon atoms, or
$R^{11}$ and $R^{12}$, together with the carbon atom to which they are attached, form an aromatic ring and $R^{13}$ is absent.

Phenol-terminated resins of formula IX used as starting materials are themselves prepared by the reaction of a polyepoxide, preferably a diepoxide, with a dihydric phenol using known methods. This reaction results in advancement of the polyepoxide through reaction with both hydroxyl groups of the dihydric phenol. There must be at least as much dihydric phenol present as there is polyepoxide, on a molar basis, in order to give a product having at least one terminal phenolic group. The molar ratio of polyepoxide to dihydric phenol is usually within the range 1:1.02 to 1:1.6, and especially 1:1.1 to 1:1.5. The preferred method of advancement is by heating the reactants at 100°–200° C. in the presence of a base, which may be a tertiary amine, but is preferably an alkali metal hydroxide. An inert solvent may be present.

The dihydric phenol which is used for advancement may be mononuclear, e.g., hydroquinone, but is preferably a bisphenol, especially one of formula XIV

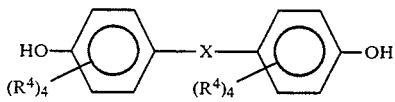

(XIV)

where X and R[4] are as hereinbefore defined, such as bis(4-hydroxyphenyl)methane and 2,2-bis(4-hydroxyphenyl)propane.

Preferred as polyepoxides for advancement to form the starting material of formula IX are those containing two terminal groups of formula XV

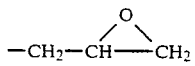

(XV)

directly attached to an atom or atoms of oxygen, nitrogen, or sulphur.

As examples of such resins may be mentioned polyglycidyl esters obtainable by reaction of a compound containing two carboxylic acid groups per molecule with epichlorohydrin or glycerol dichlorohydrin in the presence of an alkali. Such polyglycidyl esters may be derived from aliphatic polycarboxylic acids, e.g., oxalic acid, succinic acid, glutaric acid, adipic acid, pimelic acid, suberic acid, azelaic acid, sebacic acid, and dimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids, such as phthalic acid, isophthalic acid, and terephthalic acid.

Further examples are polyglycidyl ethers obtainable by reaction of a compound containing at least two free alcoholic hydroxyl or phenolic hydroxyl groups per molecule with epichlorohydrin or glycerol dichlorohydrin under alkaline conditions or, alternatively, in the presence of an acid catalyst and subsequent treatment with alkali. These ethers may be made from acyclic alcohols such as ethylene glycol, diethylene glycol, and higher poly(oxyethylene)glycols, propane-1,2-diol and poly(oxypropylene)glycols, propane-1,3-diol, butane-1,4-diol, poly(oxytetramethylene)glycols, pentane-1,5-diol, and polyepichlorohydrins; from cycloaliphatic alcohols such as resorcitol, quinitol, bis(4-hydroxycyclohexyl)methane, 2,2-bis(4-hydroxycyclohexyl)propane, and 1,1-bis(hydroxymethyl)-cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl)sulphone, 2,2-bis(4-hydroxyphenyl)propane, 2,2-bis(3,5-dibromo-4-hydroxyphenyl)propane, and 2,2-bis(2-allyl-4-hydroxyphenyl)propane.

Poly(N-glycidyl) compounds include, for example, those obtained by dehydrochlorination of the reaction products of epichlorohydrin with amines containing two amino-hydrogen atoms such as aniline, n-butylamine, and bis(4-methylaminophenyl)methane; and N,N'-diglycidyl derivatives of cyclic alkylene ureas, such as ethyleneurea and 1,3-propyleneurea, and of hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl)ether.

Polyepoxides having the 1,2-epoxide groups attached to different kinds of hetero atoms may be employed, e.g., the glycidyl ether-glycidyl ester of salicylic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

Polyepoxides containing non-terminal epoxide groups may also be employed, such as vinylcyclohexene dioxide, limonene dioxide, dicyclopentadiene oxide, 4-oxatetracyclo[6,2,1,0$^{2,7}$,0$^{3,5}$]-undec-9-yl glycidyl ether, the bis(4-oxatetracyclo[6,2,1,0$^{2,7}$,0$^{3,5}$]-undec-9-yl)ether of ethylene glycol, 3,4-epoxycyclohexylmethyl 3',4'-epoxycyclohexanecarboxylate and its 6,6'-dimethyl derivative, the bis(3,4-epoxycyclohexanecarboxylate) of ethylene glycol, and 3-(3,4-epoxycyclohexyl)-8,9-epoxy-2,4-dioxaspiro[5,5]undecane.

Also, if desired, a mixture of diepoxides may be used. If desired, polyepoxides containing more than two epoxide groups may be advanced but, as those skilled in the art of epoxide resins are aware, advancement of such resins is more difficult, there being a risk of gelation.

Preferred diepoxides are diglycidyl ethers and diglycidyl esters. Specific preferred diepoxides are diglycidyl ethers of 2,2-bis(4-hydroxyphenyl)propane or bis(4-hydroxyphenyl)methane, having a 1,2-epoxide content of more than 1.0 equivalent per kilogram.

The dihydric phenol may be used alone or, if desired, in the presence of a compound which will react with one of the terminal epoxide groups of the polyepoxide but will not react further, and so prevents further chain-lengthening reaction. Suitable such chain-terminators are secondary monoamines, monocarboxylic acids and, more especially, monohydric phenols, p-tert.butylphenol being particularly preferred. If a chain terminator is added it must be in such a quantity that at least one epoxide group per average molecule of the polyepoxide is left free to react with the dihydric phenol.

As already stated, the salts of this invention may be used, in the form of heat-curable compositions, to form surface coatings.

This invention accordingly further provides heat-curable compositions comprising 100 parts by weight of a salt of formula I, or of a salt prepared as hereinbefore described, calculated on its solids content (as hereinafter defined) and 2 to 200 parts, preferably 25 to 150 parts, by weight, calculated on its solids content, of an aminoplast, a phenol-formaldehyde resin, or a blocked polyisocyanate, the aminoplast or phenolformaldehyde resin having at least 2 groups of formula XVI

—CH$_2$OR$^{14}$     (XVI)

attached directly to an amidic nitrogen atom or atoms or directly attached to carbon atoms of a phenolic ring, where R$^{14}$ represents a hydrogen atom or an alkyl group of from 1 to 6 carbon atoms.

Such compositions in a form suitable for application will usually also contain water and a minor proportion, compared with the volume of water, of an organic solvent, such as an ether, alcohol, ketone or ester, especially 2-butoxyethanol or 2-ethoxyethanol. Methylolated compounds which may be used to form the compositions include urea-formaldehyde condensates, aminotriazine-formaldehyde condensates, especially melamine-formaldehyde and benzoguanamine-formaldehyde condensates, and phenol-formaldehyde condensates. These may be etherified if desired, e.g., the n-butyl ethers may be used. In many cases the methylolated compounds and their ethers are not themselves water-soluble or water-dispersible. Incorporation of a compound of formula I aids the dispersion or solution of such materials in water, giving stable solutions or dispersions of the mixtures.

Examples of suitable blocked polyisocyanates (i.e., those which are stable in the aqueous dispersion at room temperature but which react with the compound of formula I on heating) include di- and poly-isocyanates blocked with caprolactam, an oxime (e.g., cyclohexanone oxime), a monohydric phenol (e.g., phenol itself, p-cresol, and p-tert.butylphenol), or a monohydric aliphatic, cycloaliphatic, or araliphatic alcohol (e.g., methanol, n-butanol, decanol, 1-phenylethanol, 2-ethoxyethanol, and 2-n-butoxyethanol). Suitable isocyanates include aromatic di-isocyanates such as m-phenylene, 1,4-naphthylene, 2,4- and 2,6-tolylene, and 4,4'-methylenebis(phenylene)di-isocyanates, and also their prepolymers with glycols (e.g., ethylene glycol and propylene glycol), glycerol, trimethylolpropane, pentaerythritol, diethylene glycol, and adducts of alkylene oxides with these aliphatic di- and polyhydric alcohols.

The compositions may be cured by heating at 100° C. to 275° C., preferably 150° C. to 225° C., for from 30 seconds to 1 hour, preferably from 2 to 30 minutes.

Other water-soluble or water-dispersible film-forming substances may also be included, such as alkyd resins and acrylic resins. The amount of such materials may vary between wide limits, but should not be so great as to mask the advantageous properties of the compositions of this invention. Typically, additions of up to 50%, and preferably not more than 30% by weight may be used, these percentages being based on the solids content of the materials.

By the term "solids content", as used throughout the present specification and the claims thereto, is meant the percentage residue left after a 1 g sample of the material has been heated in a 5 cm diameter open dish in an oven at 120° C. for 3 hours at atmospheric pressure.

We have further found that if, in formula I, $R^5$ denotes a group of formula —CH($R^2$)OH, the salts may be heat-cured without including an aminoplast, a phenol-formaldehyde resin, or a blocked polyisocyanate.

A further aspect of this invention accordingly provides a method of coating a surface which comprises applying thereto a composition as hereinbefore defined or, in the absence of an aminoplast, a phenol-formaldehyde resin, or a blocked polyisocyante, a salt of formula I wherein $R^5$ denotes a group of formula —CH($R^2$)OH and heating the coated surface to a temperature within the range 100° C. to 275° C., preferably 150° C. to 225° C., e.g. for from 30 seconds to 1 hour and preferably for from 2 to 30 minutes, to cure the composition or the salt.

This invention further comprises surfaces coated with a composition of this invention, both in the cured and uncured states. Such surfaces are preferably of primed or unprimed metal, especially a ferrous metal, but may also be of wood or a heat-resistant synthetic material.

The compositions may be applied by immersion, brushing, rollering, spraying (including electrostatic spraying), by electrodeposition, or by any other conventional means. They may, if desired, include pigments and dyes. Other materials which may be incorporated include extenders such as calcium carbonate, calcium sulphate, barium sulphate, and magnesium silicate, surface-active agents, flow additives, and plasticisers. They may also contain a strong acid, e.g., an aromatic sulphonic acid or its salt with an amine or ammonia, as catalyst.

This invention is illustrated by the following Examples in which all percentages are by weight.

The starting materials used in the Examples were prepared as follows:

Phenol I

Epoxide resin I, i.e., a liquid diglycidyl polyether of 2,2-bis(4-hydroxyphenyl)propane (760 g; epoxide group content 5.25 equiv./kg), 2,2-bis(4-hydroxyphenyl)propane (684 g), and 10% aqueous sodium hydroxide solution (1.6 g) are stirred and heated under nitrogen to 160° C. The molar ratio of epoxide resin to bisphenol is 1:1.5. An exothermic reaction commences and the temperature of the mixture rises spontaneously to 197° C. The mixture is cooled to 180° C. and stirred at this temperature for a further 3 hours to give Phenol I, a phenolic hydroxyl group-terminated resin having negligible epoxide group content (not more than 0.02 equiv./kg) and an average molecular weight of 1370.

Phenol II

Epoxide resin I (359 g), 2,2-bis(4-hydroxyphenyl)propane (246 g), p-tert.butylphenol (20 g), and 10% aqueous sodium hydroxide solution (0.39 g) are stirred and heated under nitrogen to 180° C. The molar ratio of epoxide resin to bisphenol to monohydric phenol is 1:1.14:0.14. An exothermic reaction commences and the temperature of the mixture rises spontaneously to 207° C. The mixture is cooled to 180° C. and stirred at this temperature for 3½ hours to give Phenol II, a phenolic hydroxyl group-terminated resin having a negligible epoxide group content and an average molecular weight of 1880.

Phenol III 3,4-Epoxycyclohexylmethyl 3',4'-epoxycyclohexanecarboxylate (200 g; epoxide group content 7.00 equiv./kg), 2,2-bis(4-hydroxyphenyl)propane (199.5 g), and 50% aqueous tetramethylammonium chloride (2.4 g) are stirred and heated to 120° C. The molar ratio of the epoxide resin to bisphenol is 1:1.25. An exothermic reaction commences and the temperature of the mixture rises spontaneously to 132° C. The mixture is cooled to 120° C. and stirred at this temperature for a further 2 hours followed by 3 hours at 160° C. to give Phenol III, a phenolic hydroxyl group-terminated resin having a negligible epoxide group content (0.08 equiv./kg) and an average molecular weight of 1220.

Phenol IV

Epoxide resin I (114.3 g), hydroquinone (44 g), and 50% aqueous tetramethylammonium chloride (1 g) are stirred and heated to 130° C. The molar ratio of Epoxide resin I to hydroquinone is 1:1.33. An exothermic reaction commences and the temperature of the mixture rises spontaneously to 190° C. The mixture is cooled to 160° C. and stirred at this temperature for 3½ hours to give Phenol IV, a phenolic hydroxyl group-terminated resin having a negligible epoxide group content (not more than 0.02 equiv./kg) and an average molecular weight of 1520.

Phenol V

Epoxide resin II, i.e., a solid diglycidyl polyether of 2,2-bis(4-hydroxyphenyl)propane (100 g; epoxide group content 1.40 equiv./kg), 2-butoxyethanol (70 g), and acetic acid (2.1 g; 0.035 mol.) are stirred and heated to 120° C. and maintained at 120° C. for 4 hours, by which time the epoxide group content has fallen to 0.58 equiv./kg. There are added 2,2-bis(4-hydroxyphenyl)-propane (24 g) and 10% aqueous sodium hydroxide solution (0.2 g), and the mixture is heated under nitrogen to 170° C. and maintained at 170° C. for 6 hours to give a solution in 2-butoxyethanol of Phenol V, a phenolic hydroxyl group-terminated resin having a negligible epoxide group content.

Aminoplast I

This is a water-soluble, methylated hexamethylolmelamine resin of 100% solids content which contains, on average, 4.0 methoxymethyl residues per aminotriazine nucleus and has a viscosity of 10 Pa s at 25° C.

Phenoplast I

This is a commercially available butylated phenol-formaldehyde resin, supplied as a solution (56% solids content) in n-butanol containing a small amount of toluene. It is not soluble nor dispersible in water.

Blocked Isocyanate I

A mixture (43.9 g, 0.025 mol) of 2,4- and 2,6-diisocyanatotoluene (ratio 4:1) is stirred in a reactor and 2-ethylhexanol (71.5 g, 0.55 mol) containing 2 drops of dibutyltin dilaurate catalyst is added slowly, maintaining the reaction temperature below 60° C.

2-Amino-1-phenylethyl phosphonic acid

This is prepared from cinnamide and a dialkyl phosphite, followed by treatment with sodium hypobromite and hydrolysis as described in Chemical Abstracts, 73, 87977c.

1-Aminoethylidenebis(phosphonic acid) and Aminophenylmethylenebis-(phosphonic acid)

These are prepared by the action of a phosphorus trihalide on acetonitrile or benzonitrile, followed by hydrolysis, as described in Chemical Abstracts, 53, 21814e.

Free formaldehyde is determined by the following method:

About 1.5 g of the resin are weighed accurately and placed in a conical flask. Distilled water (30 ml) is added and the contents are mixed thoroughly. Thymolphthalein indicator (3 drops) is added and the mixture is adjusted to neutrality with N/10 hydrochloric acid or sodium hydroxide if necessary. The mixture is cooled in ice, and ice-cold sodium sulphite solution (25 ml, 12.5% w/w) is added. The mixture is shaken vigorously and then titrated against N/10 hydrochloric acid until the blue colour disappeares.

The percentage free formaldehyde =

$$\frac{\text{titre (ml)} \times \text{normality of HCl} \times 3.001}{\text{sample weight (g)}}.$$

EXAMPLE 1

A solution of Phenol I (50.0 g; 0.036 mole) in 2-butoxyethanol (16.7 g) is mixed with sulphanilic acid (8.7 g; 0.050 mole) and heated to 100° C. After 30 minutes at 100° C. the mixture is cooled to 80° C. and paraformaldehyde (5.0 g; 91% active content, 0.15 mole) and an 80% aqueous solution of 2-dimethylamino-2-methylpropan-1-ol (7.4 g; 0.050 mole) are added. This solution is then gently heated to 120° C. and maintained at that temperature for 3 hours, by which time the measured free formaldehyde content has fallen to 0.78%. The product has a solids content of 62% and is fully dilutable with water.

The product is substantially of formula I, where R, $R^2$, $R^3{}_1$, $R^4$, and $R^7$ denote —H, $R^1$ denotes p-phenylene, $R^3$ denotes —OH, $R^5$ denotes —H or —CH$_2$OH ortho to $R^3$, $R^6$ denotes a residue comprising units of formula

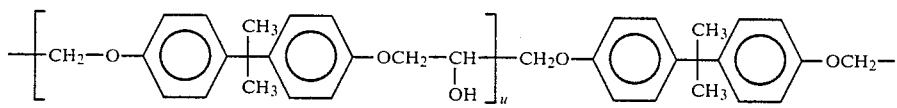

XVII wherein u has an average value 2,3, m is 2, p is zero, n is 1, s is 1, t is 1, X denotes isopropylidene para to $R^3$, $Y^{l-}$ denotes —SO$_3{}^-$, and M$^+$ denotes a group of formula HOCH$_2$C(CH$_3$)$_2$NH$^+$(CH$_3$)$_2$.

EXAMPLE 2

A solution of Phenol II (50.0 g; 0.027 mole) in 2-butoxyethanol (39 g) is mixed with sulphanilic acid (8.7 g; 0.050 mole) and heated to 100° C. An 80% aqueous solution of 2-dimethylamino-2-methylpropan-1-ol (3.9 g; 0.026 mole) is added and the mixture is maintained at 100° C. for a further 30 minutes. Then paraformaldehyde (3.3 g; 91% active content, 0.10 mole) is added and the mixture is heated at 100° C. for a further hour. The temperature is then increased to 120° C. and heating continued for a further 2½ hours, by which time the measured free formaldehyde content has fallen to 0.43%. The product has a solids content of 59% and is fully dilutable with water.

The product is substantially of formula I, where R, $R^2$, $R^3{}_1$, $R^4$, and $R^7$ denote —H, $R^1$ denotes p-phenylene, $R^3$ denotes —OH, $R^5$ denotes —H or —CH$_2$OH ortho to $R^3$, $R^6$ denotes a residue comprising units of formula XVII wherein u has an average value 4.0, (m+p) is 2, n is 1, s is 1, t is 1, $R^9$ denotes p-tert.butylphenoxy, X denotes isopropylidene para to $R^3$, $Y^{l-}$ denotes —SO$_3{}^-$, and M$^+$ denotes a group of formula HOCH$_2$C(CH$_3$)$_2$NH$^+$(CH$_3$)$_2$.

EXAMPLE 3

A solution of Phenol II (50 g; 0.027 mole) in 2-butoxyethanol (39 g) is mixed with taurine (6.3 g; 0.050 mole) and 2-(dimethylamino)ethanol (4.5 g; 0.050 mole) and heated to 120° C. After 30 minutes at 120° C. the mixture is cooled to 100° C. and paraformaldehyde (3.3 g; 91% active content, 0.10 mole) is added. The solution is gently heated to 120° C. and maintained at that temperature for 3 hours, by which time the measured free formaldehyde content has fallen to 0.45%. The product has a solids content of 59% and is fully dilutable with water.

The product is substantially of the formula I, where R, $R^2$, $R^3{}_1$, $R^4$, and $R^7$ denote —H, $R^1$ denotes —$CH_2CH_2$—, $R^3$ denotes —OH, $R^5$ denotes —H or —$CH_2OH$ ortho to $R^3$, $R^6$ denotes a residue comprising units of formula XVII wherein u is of average value 4.0, (m+p) is 2, n is 1, s is 1, t is 1, $R^9$ denotes p-tert.butylphenoxy, X denotes isopropylidene para to $R^3$, $Y^{t-}$ denotes —$SO_3{}^-$, and $M^+$ denotes a group of formula $HOCH_2CH_2NH^+(CH_3)_2$.

EXAMPLE 4

Phenol III (50 g; 0.041 mole) is mixed with 2-butoxyethanol (40 g) and heated to 120° C. When the phenol has completely dissolved the solution is cooled to 100° C. and sulphanilic acid (8.7 g; 0.050 mole), 2-(dimethylamino)ethanol (4.6 g; 0.050 mole), and 91% paraformaldehyde (5.0 g; 0.15 mole) are added. The mixture is gently heated to 140° C. and maintained at this temperature for 4 hours, by which time the measured free formaldehyde content has fallen to 0.26%. The product has a solids content of 58% and was fully dilutable with water.

The product is substantially of formula I, where R, $R^2$, $R^3{}_1$, and $R^4$ denote —H, $R^1$ denotes p-phenylene, $R^3$ denotes —OH, $R^5$ denotes —H or —$CH_2OH$ ortho to $R^3$, $R^7$ represents a covalent bond with $R^6$ which, together with the indicated hydroxyethylene group, represents a group substantially of formula

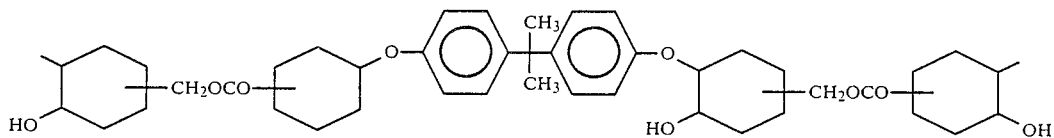

XVIII (in which every terminal bond of the indicated groups —$CH_2OCO$— is positioned 3- or 4- to the indicated hydroxyl groups), m is 2, p is zero, n is 1, s is 1, t is 1, X denotes isopropylidene para to $R^3$, $Y^{t-}$ denotes —$SO_3{}^-$, and $M^+$ denotes a group of formula $HOCH_2CH_2NH^+(CH_3)_2$.

EXAMPLE 5

Phenol IV (22.5 g; 0.015 mole) is mixed with 2-butoxyethanol (40 g) and heated to 120° C. When the phenol has completely dissolved the solution is cooled to 100° C. and sulphanilic acid (4.3 g; 0.025 mole) and 2-(dimethylamino)ethanol (2.3 g, 0.026 mole) are added. After the mixture has been maintained at 100° C. for a further 1½ hours 91% paraformaldehyde (2.5 g; 0.075 mole) is added and the temperature of the mixture is raised to 140° C. The mixture is maintained at 140° C. for 4 hours, by which time the measured free formaldehyde content has fallen to 0.30%. The product has a solids content of 42.3% and is fully dilutable with water.

The product is substantially of formula I, where R, $R^2$, $R^3{}_1$, $R^4$, and $R^7$ denote —H, $R^1$ denotes p-phenylene, $R^3$ denotes —OH, $R^5$ denotes —H or —$CH_2OH$ ortho to $R^3$, $R^6$ denotes a residue containing 2,2-bis(4-oxyphenyl)propane groups, —$CH_2CH(OH)CH_2$— groups, and p-phenylenedioxy groups, m is 2, p is zero, n is zero, s is 1, t is 1, $Y^{t-}$ denotes —$SO_3{}^-$, and $M^+$ denotes a group of formula $HOCH_2CH_2NH^+(CH_3)_2$.

EXAMPLE 6

A solution of Phenol II (20 g; 0.010 mole) in 2-butoxyethanol (20 g) is mixed with 2-amino-1-phenylethylphosphonic acid (the compound of formula XII in which $R^{11}$ represents methylene, $R^{12}$ represents phenyl, and $R^{13}$ represents hydrogen; 1.5 g, 0.0075 mole), 2-(dimethylamino)ethanol (1.5 g; 0.017 mole), and 91% paraformaldehyde (0.8 g; 0.024 mole) and heated to 120° C. After 4 hours at 120° C. the measured free formaldehyde content has fallen to zero. The product has a solids content of 52% and is fully dilutable with water.

The product is substantially of formula I, where R, $R^2$, $R^3{}_1$, $R^4$, and $R^7$ denote —H, $R^1$ denotes

$R^3$ denotes —OH, $R^5$ denotes —H or —$CH_2OH$ ortho to $R^3$ and $R^6$ denotes a residue comprising units of formula XVII wherein u have an average value of 4.0, (m+p) is 2, n is 1, s is 1, t is 2, $R^9$ denotes p-tert.butylphenoxy, X denotes isopropylidene para to $R^3$, $Y^{t-}$ denotes a group of formula V, and $M^+$ denotes a group of formula $HOCH_2CH_2NH^+(CH_3)_2$.

EXAMPLE 7

A solution of Phenol I (5 g; 0.0036 mole) in 2-butoxyethanol (11.7 g) is mixed with 2-amino-1-phenylethylphosphonic acid (0.8 g; 0.004 mole), 2-(dimethylamino)ethanol (0.4 g; 0.004 mole), and 91% paraformaldehyde (0.4 g; 0.012 mole) and heated to 120° C. After 4 hours at 120° C. the measured free formaldehyde content has fallen to zero and the product is fully dilutable with water.

The product is substantially of formula I, where R, $R^2$, $R^3{}_1$, $R^4$, and $R^7$ denote —H, $R^1$ denotes

$R^3$ denotes —OH, $R^5$ denotes —H or —$CH_2OH$ ortho to $R^3$, $R^6$ denotes a residue comprising units of formula XVII wherein u has an average value of 2.3, p is zero, m is 2, n is 1, s is 1, t is 1, X denotes isopropylidene para to $R^3$, $Y^{t-}$ denotes

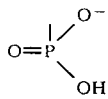

and $M^+$ denotes a group of formula $HOCH_2CH_2NH^+(CH_3)_2$.

EXAMPLE 8

A solution of Phenol I (8 g; 0.006 mole) in 2-butoxyethanol (8 g) is mixed with 1-aminoethylidenebis(phosphonic acid) (the compound of formula XII in which $R^{11}$ represents a covalent bond, $R^{12}$ represents a group of formula XIII and $R^{13}$ represents a methyl group; 1.2 g; 0.006 mole), 2-(dimethylamino)ethanol (2.2 g: 0.025 mole), and 91% paraformaldehyde (0.6 g; 0.018 mole), and heated to 120° C. After 1 hour at 120° C. the measured free formaldehyde content has fallen to zero and the product is fully dilutable with water.

The product is substantially of formula I where R, $R^2$, $R^3_1$, $R^4$, and $R^7$ denote —H, $R^1$ denotes

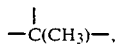

$R^3$ denotes —OH, $R^5$ denotes —H or —CH$_2$OH ortho to $R^3$, $R^6$ denotes a residue comprising units of formula XVII wherein u has an average value of 2.3, p represents zero, m represents 2, n represents 1, s represents 2, t represents 2, X denotes isopropylidene para to $R^3$, $Y^{t-}$ denotes

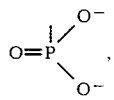

and $M^+$ denotes a group of formula HOCH$_2$CH$_2$NH$^+$(CH$_3$)$_2$.

EXAMPLE 9

A solution of Phenol I (20 g; 0.015 mole) in 2-butoxyethanol (20 g) is mixed with aminophenylmethylene bis(phosphonic acid) (the compound of formula XII in which $R^{11}$ represents a covalent bond, $R^{12}$ represents a group of formula XIII, and $R^{13}$ represents a phenyl group; 4.0 g; 0.015 mole) in 2-(dimethylamino)ethanol (5.4 g; 0.060 mole) and 91% paraformaldehyde (1.5 g; 0.045 mole) and heated to 120° C. After 1 hour at 120° C. the measured free formaldehyde content has fallen to zero and the product is fully dilutable with water.

The product is substantially of formula I where R, $R^2$, $R^3_1$, $R^4$, and $R^7$ denote —H, $R^1$ denotes —C(C$_6$H$_5$)<, $R^3$ denotes —OH, $R^5$ denotes —H or —CH$_2$OH ortho to $R^3$, $R^6$ denotes a residue comprising units of formula XVII wherein u has an average value of 2.3, p is zero, m is 2, s is 2, t is 2, n is 1, X denotes isopropylidene para to $R^3$, $Y^{t-}$ denotes

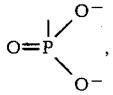

and $M^+$ denotes a group of formula HOCH$_2$CH$_2$NH$^+$(CH$_3$)$_2$.

EXAMPLE 10

The solution (50 g) of Phenol V is mixed with taurine (6.3 g; 0.050 mol) and 2-(dimethylamino)ethanol (4.2 g; 0.047 mol) and heated to 100° C. When the mixture reaches 100° C. 91% paraformaldehyde (3.3 g; 0.1 mol) is added and heating is continued to a temperature of 140° C. The mixture is maintained at 140° C. for 3 hours, by which time the measured free formaldehyde content has fallen to 0.6%. The product has a solids content of 62.5% and is fully dilutable with water.

The product is substantially of average formula I, where R, $R^2$, $R^3_1$, $R^4$, and $R^7$ denote —H, $R^1$ denotes —CH$_2$CH$_2$—, $R^3$ denotes —OH, $R^5$ denotes —H or —CH$_2$OH ortho to $R^3$, $R^6$ denotes a residue comprising units of formula XVII wherein u is of average value 3.9, (m+p) is 2, n is 1, $R^9$ denotes CH$_3$COO—, X denotes isopropylidene para to $R^3$, and $M^+$ denotes a group of formula HOCH$_2$CH$_2$NH$^+$(CH$_3$)$_2$.

EXAMPLE 11

A solution of phenol I (64.4 g; 0.046 mol) in 2-butoxyethanol (21.5 g) is mixed with sulphanilic acid (10.4 g; 0.06 mol) and heated to 120° C. After 30 minutes at 120° C. the mixture is cooled to 100° C. and 91% paraformaldehyde (6 g; 0.18 mol) and 2-(dimethylamino)ethanol (5.3 g; 0.06 mol) are added. This solution is then gently heated to 140° C. and maintained at 140° C. for 4½ hours, by which time the measured free formaldehyde content has fallen to 0.9%. The product has a solids content of 66.5% and is fully dilutable with water.

The product is substantially of average formula I, where R, $R^2$, $R^3_1$, $R^4$, and $R^7$ denote —H, $R^1$ denotes p-phenylene, $R^3$ denotes —OH, $R^5$ denotes —H or —CH$_2$OH ortho to $R^3$, $R^6$ denotes a residue comprising units of formula XVII wherein u has an average value of 2.3, m is 2, n is 1, X denotes isopropylidene para to $R^3$, and $M^+$ denotes a group of formula HOCH$_2$CH$_2$NH$^+$(CH$_3$)$_2$.

EXAMPLES 12-13

Coating formulations are prepared by mixing the products of, respectively, Examples 1 and 3 with Aminoplast I in the ratio 70:30 calculated on solids content. The resulting solutions are diluted with water to a viscosity of 20-30 mPa s and applied to tin-coated steel plates by spin-coating, leaving a coating about 2 μm thick. The plates are then heated at 215° C. for 3 minutes and tested. The results are shown in Table I.

EXAMPLES 14-15

Coating formulations are prepared by mixing the products of, respectively, Examples 3 and 7 with Phenoplast I in the ratio 70:30 calculated on the solids contents. The resulting solutions are diluted with water to a viscosity of 20-30 mPa s and applied to aluminium-coated or tin-coated steel plates by spin-coating, leaving a coating 2-4 μm thick. The plates are then heated at 200° C. for 15 minutes and tested. The results are also shown in Table I.

TABLE 1

| | EXAMPLES | | | | | |
|---|---|---|---|---|---|---|
| | | | 14 | | 15 | |
| TEST | 12 | 13 | Aluminium plate | Tin plate | Aluminium plate | Tin plate |
| MEK rub[1] | Pass | Pass | Pass | Pass | Pass | Pass |
| Wedge bend[2] pass at | 70 | 70 | — | 70 | — | 75 |
| Pasteurisation in water 75° C./40 minutes[3] | Pass | Pass | — | — | — | — |
| 3% Acetic acid 100° C./½ hour[3] | — | — | Pass | Pass | Pass | Pass |
| 3% Acetic acid | — | — | Pass | Fail | Pass | Pass |

TABLE 1-continued

| | EXAMPLES | | | | |
|---|---|---|---|---|---|
| | | | 14 | 15 | |
| TEST | 12 | 13 | Aluminium plate | Tin plate | Aluminium plate | Tin plate |
| 100° C./6 hours[3] | | | | | |

A dash (—) indicates that the test was not carried out.
[1]The MEK rub test comprises giving the coated surface 50 double rubs with cotton wool soaked in ethyl methyl ketone and examining the surface for removal or softening. 'Pass' indicates that no effect is observed.
[2]The wedge bend test comprises impact-bending the specimens over a mandrel 10 cm long, having an outside diameter of 6 mm at one end and tapering to a point at the other. The specimens are then examined to determine the percentage of the length of the sample from which the coating does not flake off.
[3]The pasteurisation and boiling tests comprises heating the samples in water or acetic acid for the given time and temperature and examining the coated surface for any defects. 'Pass' indicates that no defects are observed.

EXAMPLE 16

A formulation for coatings comprising the product of Example 2 (13.8 g), blocked Isocyanate I (2.0 g), dibutyltin dilaurate (0.6 g), and water as required to give a viscosity at 25° C. for 20–30 mPa s is applied to tin-coated steel plates by spin-coating, leaving a coating 5 μm thick. The plates are heated at 180° C. for 30 minutes. The coating passes the MEK rub test described above.

EXAMPLE 17

In this Example a carboxylate salt of this invention is cured by heating alone, i.e., in the absence of an aminoplast, a phenoplast, or a blocked polyisocyanate.

The product of Example 11 is diluted with water to give a viscosity at 25° C. of 20–30 mPa s and applied to tin-coated steel plates by spin-coating, leaving a coating 2 to 4 μm thick. The coating is cured by heating at 215° C. for 10 minutes. The coating passes the MEK rub test and pasteurisation in water test described above.

What is claimed is:

1. A salt of the general formula I $$\left[ R^9-\underset{OH}{\underset{|}{CH}}-\underset{|}{\overset{R^7}{CH}}\right]_p R^6 \left[ \underset{OH}{\underset{|}{CH}}-\overset{R^7}{\underset{|}{CH}}O - \underset{(R^4)_4}{\bigcirc} -X - \right]_n \left[ \begin{array}{c} R^3_1 \quad R^5 \\ \bigcirc \\ R^3 \\ R^4 \quad \underset{R^2}{\underset{|}{CH}}-\underset{R}{\underset{|}{N}}-R^1-(Y^{t-})_s(M^+)_{st} \end{array} \right]_m \quad (I)$$

where
R represents a hydrogen atom or an alkyl group of from 1 to 6 carbon atoms,
R¹ represents an aliphatic, aromatic, or araliphatic di- or trivalent hydrocarbon group having up to 10 carbon atoms, R² represents a hydrogen atom or an alkyl group of 1 to 4 carbon atoms,
one of R³ and R³₁ represents a hydroxyl group and the other represents a hydrogen atom, a halogen atom, an alkyl group of 1 to 4 carbon atoms, or an alkenyl group of 2 to 4 carbon atoms,
each R⁴ represents a hydrogen atom, a halogen atom, an alkyl group of 1 to 4 carbon atoms, or an alkenyl group of 2 to 4 carbon atoms,
R⁵ represents an atom or a group bonded to a ring carbon atom which is ortho or para to the group R³ or R³₁ that represents a hydroxyl group, and is a hydrogen atom, a halogen atom, an alkyl group of 1 to 4 carbon atoms, an alkenyl group of 2 to 4 carbon atoms, a group of formula —CH(R²)OH, a group of formula —CH(R²)OR⁸, or a group of formula II $$-\underset{R^2}{\underset{|}{CH}}-\underset{R}{\underset{|}{N}}-R^1+(Y^{t-})_s(M^+)_{st} \qquad (II)$$

R⁶ represents the residue of a polyepoxide after removal of (m+p) 1,2-epoxide groups,
each of the substituents R⁷ represents either a hydrogen atom or a covalent bond linked to the group R⁶ to form a cycloaliphatic ring,
R⁸ represents either an alkyl group of from 1 to 6 carbon atoms or an alkoxyalkyl group wherein the alkoxy group and the alkyl group each have from 1 to 6 carbon atoms,
R⁹ represents the residue of a monohydric phenol, a secondary monoamine, or a monocarboxylic acid after removal of the hydrogen atom of the phenolic hydroxyl group, the secondary amino group, or the carboxylic acid group,
m represents 1, 2, 3 or 4,
n represents zero or 1,
p represents zero or 1 such that (m+p) is at least 2 and at most 4,
t represents 1 or 2,
X represents an alkylene or alkylidene group of 1 to 3 carbon atoms, a carbonyl or sulfonyl group, an oxygen or sulfur atom, or a valence bond,
M⁺ represents a hydrogen ion, a cation derived from an alkali metal, ammonia, an amine, including quaternary ammonium cations, or one valence of a polyvalent cation, with the proviso that at least 25% of the ions M⁺ represent a said cation,
s represents 1 or 2, and
Y^{t−} represents an anion of formulae III, IV or V $$\underset{O}{\overset{O}{\underset{\|}{\overset{\|}{-S}}}}-O^- \qquad \underset{OH}{\overset{O}{\underset{\|}{\overset{\|}{-P}}}}\underset{}{\overset{O^-}{\diagup}} \quad or \quad \underset{O^-}{\overset{O}{\underset{\|}{\overset{\|}{-P}}}}\underset{}{\overset{O^-}{\diagup}}$$

(III)      (IV)      (V)

2. The salt of claim 1 wherein R⁶ represents said residue having an average molecular weight of from 1000 to 5000.

3. The salt of claim 1 wherein R represents a hydrogen atom and R¹ represents an alkylene or alkylidene group of 1 to 4 carbon atoms or an arylene, aralkylidene, or aralkylene group having up to 10 carbon atoms.

4. The salt of claim 1 which are also of the formulae VI or VII

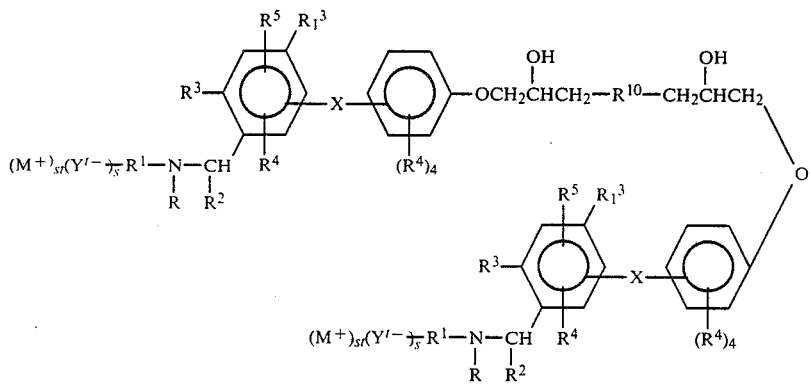

or of the formula

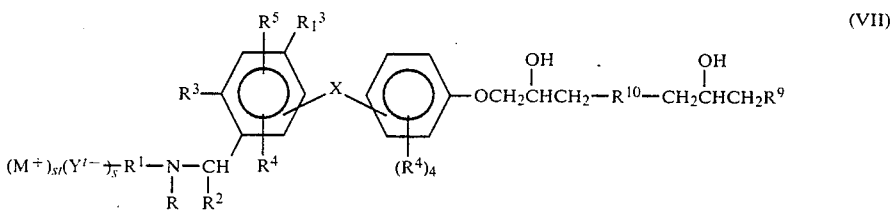

wherein R, $R^1$, $R^2$, $R^3_1$, $R^4$, $R^5$, $R^9$, X, Y, $M^+$, s and t are as defined in claim 1, and $R^{10}$ represents the residue of an aliphatic, cycloaliphatic, or aromatic diglycidyl ether or diglycidyl ester after removal of both glycidyl groups.

5. The salt of claim 1 wherein $R^2$ and $R^4$ each represent a hydrogen atom.

6. Process for the preparation of water-soluble or water-dispersible salts which comprises reaction of a phenol-terminated resin of formula IX

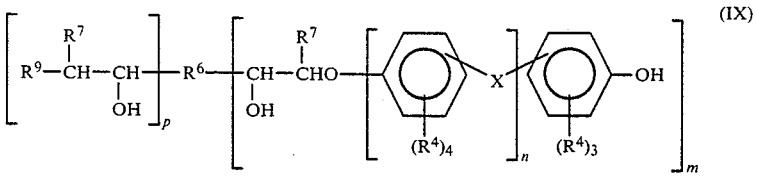

where
each $R^4$ represents a hydrogen atom, a halogen atom, an alkyl group of 1 to 4 carbon atoms, or an alkenyl group of 2 to 4 carbon atoms,
$R^6$ represents the residue of a polyepoxide after removal of (m+p) 1,2-epoxide groups,
each $R^7$ represents either a hydrogen atom or a covalent bond which is linked to the groups $R^6$ to form a cycloaliphatic ring,
$R^9$ represents the residue of a monohydric phenol, a secondary monoamine, or a monocarboxylic acid after removal of the hydrogen atom of the phenolic hydroxyl group, the secondary amino group, or the carboxylic acid group,
m represents 1, 2, 3 or 4,
n represents zero or 1,
p represents zero or 1, such that (m+p) is at least 2 and at most 4, and X represents an alkylene or alkylidene group of 1 to 3 carbon atoms, a carbonyl or sulfonyl group, an oxygen or sulfur atom, or a valence bond, with the proviso that at least one of the two carbon atoms ortho, or the one carbon atom para, to the carbon atom bearing the indicated phenolic hydroxyl group is unsubstituted,
in the presence of a source of $M^+$ ions, with an aldehyde of formula X $$R^2CHO \qquad (X)$$

and an aminosulfonic or aminophosphonic acid of formula XI

where
R represents a hydrogen atom or an alkyl group of from 1 to 6 carbon atoms,
$R^2$ represents a hydrogen atom or an alkyl group of from 1 to 4 carbon atoms,
$M^+$ represents a hydrogen ion, a cation derived from an alkali metal, ammonia, an amine, including quaternary ammonium cations, or one valence of a polyvalent cation, with the proviso that at least 25% of the ions $M^+$ represent a said cation, $R^1_1$ represents an aliphatic, aromatic, or araliphatic di- or trivalent hydrocarbon group having up to 10 carbon atoms, and Y represents the residue of a sulfonic or phosphonic acid after removal of one hydrogen atom.

7. The process of claim 6 in which $R^6$ represents said residue having an average molecular weight of from 1000 to 6000.

8. The process of claim 6 in which 0.3 to 2.0 moles of the amino acid of formula XI are employed per mole of phenolic hydroxyl groups in the resin of formula IX.

9. The process of claim 6 in which 1.1 to 4.0 moles of the aldehyde of formula X are used per mole of the acid of formula XI.

* * * * *